United States Patent
Dunning et al.

(10) Patent No.: US 7,251,665 B1
(45) Date of Patent: Jul. 31, 2007

(54) DETERMINING A KNOWN CHARACTER STRING EQUIVALENT TO A QUERY STRING

(75) Inventors: Ted E. Dunning, San Diego, CA (US); Bradley D. Kindig, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/848,982

(22) Filed: May 3, 2001

Related U.S. Application Data

(60) Provisional application No. 60/201,622, filed on May 3, 2000.

(51) Int. Cl.
*G06F 17/30* (2006.01)

(52) U.S. Cl. .................. 707/104.1; 707/7; 707/10

(58) Field of Classification Search .............. 704/1, 704/9, 10, 7; 707/530–533, 536, 540, 104.1; 382/230, 224, 229
See application file for complete search history.

(56) References Cited

U.S. PATENT DOCUMENTS

| | | | | |
|---|---|---|---|---|
| 3,568,156 A | | 3/1971 | Thompson | ............... 340/172.5 |
| 4,384,329 A | * | 5/1983 | Rosenbaum et al. | ........... 704/10 |
| 4,833,610 A | * | 5/1989 | Zamora et al. | ............. 434/167 |
| 5,062,143 A | * | 10/1991 | Schmitt | ........................ 382/228 |
| 5,182,708 A | * | 1/1993 | Ejiri | ............................... 704/1 |
| 5,241,674 A | | 8/1993 | Kuorsawa et al. | .............. 707/6 |
| 5,303,150 A | | 4/1994 | Kameda | ......................... 704/9 |
| 5,303,302 A | | 4/1994 | Burrows | |
| 5,371,807 A | * | 12/1994 | Register et al. | .............. 382/159 |
| 5,392,212 A | | 2/1995 | Geist | .......................... 707/532 |
| 5,404,505 A | | 4/1995 | Levinson | |
| 5,418,951 A | * | 5/1995 | Damashek | ...................... 707/5 |
| 5,497,488 A | | 3/1996 | Akizawa et al. | ................ 707/6 |
| 5,499,046 A | | 3/1996 | Schiller | |
| 5,539,635 A | | 7/1996 | Larson, Jr. | |
| 5,548,507 A | * | 8/1996 | Martino et al. | ................. 704/1 |
| 5,583,763 A | | 12/1996 | Atcheson | |
| 5,592,511 A | | 1/1997 | Schoen | |
| 5,608,622 A | | 3/1997 | Church | |

(Continued)

FOREIGN PATENT DOCUMENTS

AU        A-53031/98        8/1998

(Continued)

OTHER PUBLICATIONS

Jones, Karen S. and Willett, Peter, "Reading In Information Retrieval," Morgan Kaufmann Publishers, Inc., 1997, pp. 25-110, 205-246, 257-412, 440-445, 469-502, 527-533.

(Continued)

*Primary Examiner*—Leslie Wong
(74) *Attorney, Agent, or Firm*—James J. DeCarlo; Greenberg Traurig LLP

(57) ABSTRACT

A system, method, and computer program product perform text equivalencing. The text equivalencing is performed by modifying a string of characters by applying a set of heuristics, comparing the modified strings of characters to known strings of characters. If a match is found, the text equivalencing engine performs database update and exits. If no match is found, sub-strings are formed by grouping together frequently occurring sets of characters. An information retrieval technique is performed on the sub-strings to determine equivalent text.

12 Claims, 5 Drawing Sheets

U.S. PATENT DOCUMENTS

| | | | |
|---|---|---|---|
| 5,616,876 A | 4/1997 | Cluts | |
| 5,661,787 A | 8/1997 | Pocock | |
| 5,675,786 A | 10/1997 | McKed | |
| 5,678,054 A | 10/1997 | Shibata | 707/532 |
| 5,706,365 A * | 1/1998 | Rangarajan et al. | 707/102 |
| 5,708,709 A | 1/1998 | Rose | |
| 5,713,016 A | 1/1998 | Hill | |
| 5,721,827 A | 2/1998 | Logan et al. | |
| 5,726,909 A | 3/1998 | Krikorian | |
| 5,740,134 A | 4/1998 | Peterson | |
| 5,751,672 A | 5/1998 | Yankowski | |
| 5,754,938 A | 5/1998 | Herz | |
| 5,758,257 A | 5/1998 | Herz | |
| 5,764,235 A | 6/1998 | Hunt et al. | |
| 5,774,357 A | 6/1998 | Hoffberg | |
| 5,790,423 A | 8/1998 | Lan et al. | |
| 5,790,935 A | 8/1998 | Payton | |
| 5,809,246 A | 9/1998 | Goldman et al. | |
| 5,819,160 A | 10/1998 | Foladare et al. | |
| 5,842,010 A | 11/1998 | Jain | |
| 5,862,220 A | 1/1999 | Perlman | |
| 5,862,339 A | 1/1999 | Bonnaure | |
| 5,864,868 A | 1/1999 | Contois | |
| 5,872,921 A | 2/1999 | Zahariev | |
| 5,881,234 A | 3/1999 | Schwab | |
| 5,883,986 A | 3/1999 | Kopec | |
| 5,884,312 A | 3/1999 | Dustan | |
| 5,898,833 A | 4/1999 | Kidder | |
| 5,913,040 A | 6/1999 | Rakavy | |
| 5,913,041 A | 6/1999 | Ramanathan | |
| 5,926,207 A | 7/1999 | Vaughan | |
| 5,930,526 A | 7/1999 | Iverson | |
| 5,930,768 A | 7/1999 | Hooban | |
| 5,931,907 A | 8/1999 | Davies | |
| 5,941,951 A | 8/1999 | Day | |
| 5,945,988 A | 8/1999 | Williams | |
| 5,950,189 A | 9/1999 | Cohen | |
| 5,956,482 A | 9/1999 | Agraharam | |
| 5,960,430 A * | 9/1999 | Haimowitz et al. | 707/6 |
| 5,969,283 A | 10/1999 | Looney | |
| 5,977,964 A | 11/1999 | Williams | |
| 5,983,176 A | 11/1999 | Hoffert | |
| 5,987,525 A | 11/1999 | Roberts | |
| 5,996,015 A | 11/1999 | Day | |
| 6,000,008 A * | 12/1999 | Simcoe | 711/108 |
| 6,009,382 A * | 12/1999 | Martino et al. | 704/1 |
| 6,012,098 A | 1/2000 | Bayeh | |
| 6,020,883 A | 2/2000 | Herz | |
| 6,021,203 A | 2/2000 | Douceur | |
| 6,026,398 A * | 2/2000 | Brown et al. | 704/1 |
| 6,026,439 A | 2/2000 | Chowdhury | |
| 6,029,195 A | 2/2000 | Herz | |
| 6,031,795 A | 2/2000 | Wehmeyer | |
| 6,031,797 A | 2/2000 | Van Ryzin | |
| 6,035,268 A * | 3/2000 | Carus et al. | 704/9 |
| 6,038,527 A | 3/2000 | Renz | |
| 6,038,591 A | 3/2000 | Wolfe | |
| 6,047,251 A | 4/2000 | Pon | |
| 6,047,268 A | 4/2000 | Bartoli | |
| 6,047,320 A | 4/2000 | Tezuka | |
| 6,047,327 A | 4/2000 | Tso | |
| 6,052,717 A | 4/2000 | Reynolds | |
| 6,061,680 A | 5/2000 | Scherf | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,097,719 A | 8/2000 | Benash | |
| 6,102,406 A | 8/2000 | Miles | |
| 6,105,022 A | 8/2000 | Takahashi et al. | 707/3 |
| 6,131,082 A * | 10/2000 | Hargrave et al. | 704/7 |
| 6,134,532 A | 10/2000 | Lazarus | |
| 6,138,142 A | 10/2000 | Linsk | |
| 6,154,773 A | 11/2000 | Roberts | |
| 6,161,132 A | 12/2000 | Roberts | |
| 6,161,139 A | 12/2000 | Win | |
| 6,167,369 A * | 12/2000 | Schulze | 704/9 |
| 6,182,142 B1 | 1/2001 | Win | |
| 6,185,560 B1 | 2/2001 | Young et al. | 707/6 |
| 6,192,340 B1 | 2/2001 | Abecassis | |
| 6,205,126 B1 | 3/2001 | Moon | |
| 6,222,980 B1 | 4/2001 | Asai | |
| 6,225,546 B1 | 5/2001 | Kraft | |
| 6,230,192 B1 | 5/2001 | Roberts | |
| 6,230,207 B1 | 5/2001 | Roberts | |
| 6,240,459 B1 | 5/2001 | Roberts | |
| 6,246,672 B1 | 6/2001 | Lumelsky | |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 * | 8/2001 | de Campos | 704/8 |
| 6,272,495 B1 | 8/2001 | Hetherington | 707/101 |
| 6,282,548 B1 | 8/2001 | Burner | |
| 6,292,795 B1 | 9/2001 | Peters et al. | |
| 6,298,446 B1 | 10/2001 | Schreiber | |
| 6,314,421 B1 * | 11/2001 | Sharnoff et al. | 707/100 |
| 6,317,761 B1 | 11/2001 | Landsman | |
| 6,321,205 B1 | 11/2001 | Eder | |
| 6,321,221 B1 | 11/2001 | Bieganski | |
| 6,330,593 B1 | 12/2001 | Roberts | |
| 6,343,317 B1 | 1/2002 | Glorikian | |
| 6,353,849 B1 | 3/2002 | Linsk | |
| 6,370,315 B1 | 4/2002 | Mizuno | |
| 6,370,513 B1 | 4/2002 | Kolawa | |
| 6,389,467 B1 | 5/2002 | Eyal | |
| 6,405,203 B1 | 6/2002 | Collart | |
| 6,430,539 B1 | 8/2002 | Lazarus et al. | |
| 6,434,535 B1 | 8/2002 | Kupka | |
| 6,438,579 B1 | 8/2002 | Hosken | |
| 6,487,598 B1 | 11/2002 | Valencia | |
| 6,490,553 B2 | 12/2002 | Van Thong | |
| 6,505,160 B1 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |
| 6,526,411 B1 | 2/2003 | Ward | |
| 6,532,477 B1 | 3/2003 | Tang | |
| 6,535,854 B2 | 3/2003 | Buchner | |
| 6,538,996 B1 | 3/2003 | West | |
| 6,560,403 B1 | 5/2003 | Tanaka | |
| 6,560,704 B2 | 5/2003 | Dieterman | |
| 6,587,127 B1 | 7/2003 | Leeke | |
| 6,611,812 B2 | 8/2003 | Hurtado | |
| 6,611,813 B1 | 8/2003 | Bratton | |
| 6,614,914 B1 | 9/2003 | Rhoads | |
| 6,615,208 B1 | 9/2003 | Behrens | |
| 6,655,963 B1 | 12/2003 | Horvitz | |
| 6,657,117 B2 | 12/2003 | Weare | |
| 6,658,151 B2 | 12/2003 | Lee | |
| 6,661,787 B1 | 12/2003 | O'Connell | |
| 6,677,894 B2 | 1/2004 | Sheynblat | |
| 6,725,446 B1 | 4/2004 | Hahn | |
| 6,741,980 B1 | 5/2004 | Langseth | |
| 6,757,740 B1 | 6/2004 | Parekh | |
| 6,807,632 B1 | 10/2004 | Carpentier | |
| 6,889,383 B1 | 5/2005 | Jarman | |
| 6,925,441 B1 | 8/2005 | Jones, III | |
| 6,952,523 B2 | 10/2005 | Tanaka | |
| 2001/0005823 A1 | 6/2001 | Fischer | |
| 2001/0042107 A1 | 11/2001 | Palm | |
| 2001/0042109 A1 | 11/2001 | Bolas | |
| 2001/0044855 A1 | 11/2001 | Vermeire | |
| 2001/0052028 A1 | 12/2001 | Roberts | |

| | | |
|---|---|---|
| 2001/0055276 A1 | 12/2001 | Rogers |
| 2002/0002039 A1 | 1/2002 | Qureshey |
| 2002/0004839 A1 | 1/2002 | Wine |
| 2002/0007418 A1 | 1/2002 | Hegde |
| 2002/0010621 A1 | 1/2002 | Bell |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith |
| 2002/0035561 A1* | 3/2002 | Archer et al. ............... 707/6 |
| 2002/0045717 A1 | 4/2002 | Grenda |
| 2002/0056004 A1 | 5/2002 | Smith |
| 2002/0065857 A1 | 5/2002 | Michalewicz |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0111912 A1 | 8/2002 | Hunter |
| 2002/0129123 A1 | 9/2002 | Johnson |
| 2002/0152204 A1* | 10/2002 | Ortega et al. ............... 707/3 |
| 2002/0175941 A1 | 11/2002 | Hand |
| 2003/0002608 A1 | 1/2003 | Glenn |
| 2003/0007507 A1 | 1/2003 | Rajwan et al. |
| 2003/0028796 A1 | 2/2003 | Roberts |
| 2003/0046283 A1 | 3/2003 | Roberts |
| 2003/0083871 A1 | 5/2003 | Foote |
| 2003/0093476 A1 | 5/2003 | Syed |
| 2003/0133453 A1 | 7/2003 | Makishima |
| 2003/0135513 A1 | 7/2003 | Quinn |
| 2003/0139989 A1 | 7/2003 | Churquina |
| 2003/0165200 A1 | 9/2003 | Pugel |
| 2003/0182139 A1 | 9/2003 | Harris |
| 2003/0190077 A1* | 10/2003 | Ross et al. ............... 382/229 |
| 2003/0206558 A1 | 11/2003 | Parkkinen |
| 2005/0149759 A1 | 7/2005 | Vishwanath |

FOREIGN PATENT DOCUMENTS

| | | |
|---|---|---|
| EP | 0 847 156 A2 | 10/1998 |
| EP | 0 955 592 A2 | 11/1999 |
| EP | 0 955 592 A3 | 11/1999 |
| EP | 1 050 833 | 11/2000 |
| EP | 1 050 833 A2 | 11/2000 |
| EP | 1 236 354 | 5/2001 |
| EP | 1 010 098 B1 | 6/2003 |
| GB | 2 306 869 | 7/1997 |
| JP | 2001202368 | 7/2001 |
| JP | 2001521642 T | 11/2001 |
| WO | WO 97/07467 | 2/1997 |
| WO | WO 98/25269 A1 | 6/1998 |
| WO | WO 98/47080 A2 | 10/1998 |
| WO | WO 99/27681 | 6/1999 |
| WO | WO 99/43111 | 8/1999 |
| WO | WO 00/31964 | 6/2000 |
| WO | WO 00/46681 A1 | 8/2000 |
| WO | WO 01/33379 A1 | 10/2000 |
| WO | WO 01/54323 A2 | 1/2001 |
| WO | WO 01/35667 A1 | 5/2001 |
| WO | WO 01/73639 A1 | 10/2001 |
| WO | WO 02/42862 A2 | 5/2002 |
| WO | WO 03/012695 A2 | 2/2003 |

OTHER PUBLICATIONS

Salton, Gerard and McGill, Michael J., "Introduction to Modern Information Retrieval," Computer Science Series, McGraw-Hill, Inc., 1983, pp. 1-23. 52-156, 199-302, 354-435.

van Rijsbergen, C. J., "Information Retrieval," [online], 1979 [retrieved on Aug. 24, 2001] Retrieved from the Internet <URL: http://www.dcs.gla.ac.uk/Keith/Preface.html>.

Witten, I. H. and Frank, Eibe, "Data Mining Practical Machine Learning Tools and Techniques with Java Implementations," Academic Press, 2000, pp. 57-76.

Agosti, M., Gradenigo, G., Marchetti, P.G., "A Hypertext Environment for Interacting with Large Textual Databases," pp. 469-477.

Belkin, N. J., Oddy, R.N., Brooks, H. M., "The Journal of Documentation", vol. 38, No. 2, Jun. 1982, pp. 299-304.

de Marcken, Carl, "The Unsupervised Acquisition of a Lexicon from Continuous Speech," Massachusetts Institute of Technology Artificial Intelligence Laboratory; Center for Biological and Computational Learning, Department of Brain and Cognitive Sciences, A.I. Memo No. 1558 and C.B.C.L. Memo No. 129, Nov. 2001, pp. 1-27.

Griffiths, Alan, Luckhurst, H. Claire and Willett, Peter, Using Interdocument Similarity Information in Document Retrieval Systems, pp. 365-373.

Hull, David A. and Grefenstette, Gregory, "Querying Across Languages: A Dictionary-Based Approach to Multilingual Information Retrieval," pp. 484-492.

Jones, K. Sparck, Jones, G.J.F., Foote, J.T. and Young, S.J., "Experiments in Spoken Document Retrieval," pp. 493-502.

Jones, Karen Sparck, "Search Term Relevence Weighting Given Little Relevance Information," revised version received Jan. 14, 1979, pp. 329-338.

Keen, E. Michael, "Presenting Results of Experimental Retrieval Comparisons," Department of Information & Library Studies, University College of Wales, Aberystwyth, SY23 3AS, U.K., pp. 217-222.

Lancaster, F.W., "MEDLARS: Report on the Evaluation of Its Operating Efficiency," pp. 223-246.

McCune, Brian P., Tong, Richard M., Dean, Jeffrey S. and Shapiro, Daniel G., "RUBRIC: A System for Rule-Based Information Retrieval," pp. 440-445.

"Mel-Frequency Cepstral Analysis," [online] [retrieved on Feb. 2, 2001] Retrieved from the Internet <URL:http://ccrma-www.stanford.edu/~unjung/mylec/mfcc.html>, pp. 1-3.

Rau, Lisa F., "Conceptual Information Extraction and Retrieval from Natural Language Input," Artificial Intelligence Program GE Research and Development Center, Schenectady, NY 12301, pp. 527-533.

Robertson, S.E., "The Probability Ranking Principle in IR," pp. 281-286.

Robertson, S.E. and Walker, S, "Some Simple Effective Approximations to the 2-Poisson Model for Probabilistic Weighted Retrieval," pp. 345-354.

Salton, G and McGill, M.J., "The SMART and SIRE Experimental Retrieval Systems," pp. 381-399.

Salton, G., Wong, A. and Yang, C.S., "A Vector Space Model for Automatic Indexing," revised Mar. 1975, pp. 273-280.

Salton, Gerard, Allan, James, Buckley, Singhal, Amit, "Automatic Analysis, Theme Generation, and Summarization of Machine-Readable Texts," pp. 478-483.

Salton, Gerard and Buckley, Christopher, "Term-Weighting Approaches in Automatic Text Retrieval," accepted in final form Jan. 26, 1988, pp. 323-328.

Strzalkowski, Tomek, "Robust Text Processing in Automated Information Retrieval," pp. 317-322.

Tague-Sutcliffe, Jean, "The Pragmatics of Information Retrieval Experimentation, Revisited," pp. 205-222.

M. F. Porter, "An Algorithm For Suffix Stripping," Computer Laboratory, Corn Exchange Street, Cambridge, pp. 313-316.

W. B. Croft and D. J. Harper, "Using Probabilistic Models of Document Retrieval Without Relevance Information," Department of Computer and Information Science, University of Maxxachusetts, Amherst, and Computer Laboratory, University of Cambridge, pp. 339-334.

U.S. Appl. No. 60/144,377, filed Jul. 16, 1999, Benjamin E. Hosken.
U.s. Appl. No. 60/165,726, filed Nov. 15, 1999, Sean Michael Ward.
U.S. Appl. No. 60/165,727, filed Nov. 15, 1999, Sean Michael Ward.
U.S. Appl. No. 60/166,039, filed Nov. 17, 1999, Sean Michael Ward.

"Fast Algorithms for Projected Clustering;" Charu C. Aggarwal, Cecilia Procopiuc, Joel L. Wolf, Philip S. Yu, and Jong Soo Park. Proceedings of the ACM SIGMOD International Conference on Management of Data, 1999.

R. Brody, Ph.D., "The Conditions and Consequences of Profiling in Commercial and Governmental Settings," Technology And Society, 1998. ISTAS 98. Wiring The World: The Impact Of Information Technology On Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

Chapter 3—"Key Concepts," pp. 85-92 Found in: Readings in Information Retrieval, Edited by Karen Sparck Jones & Peter Willett, Morgan Kaufmann Publishers, Inc., San Francisco, CA © 1997.

MusicMatch Literature downloaded from web.archive.org—7 pages total.

RealNetworks Literature downloaded from web.archive.org—16 pages total.

Cyril Cleverdon, "The Cranfield Tests On Index Language Devices," presented Apr. 27th 1967, pp. 47-59, Found in: Readings in Information Retrieval, Edited by Karen Sparck Jones & Peter Willett, Morgan Kauffman Publishers, Inc., San Francisco, CA © 1997.

Cyril W. Cleverdon & J. Mills, "The Testing Of Index Language Devices," presented Feb. 5, 1963, Chapter 3—Key Concepts, pp. 98-110, Found in: Readings in Information Retrieval, Edited by Karen Sparck Jones & Peter Willett, Morgan Kauffmann Publishers, Inc., San Francisco, CA © 1997.

G. Salton & M.E. Lesk, "Computer Evaluation Of Indexing and Text Processing," pp. 60-84, Found in: Readings in Information Retrieval, Edited by Karen Sparck Jones & Peter Willett, Morgan Kaufmann Publishers, Inc., San Francisco, CA © 1997.

Goldberg, Gribble, Wagner, Brewer "The Ninja Jukebox" Oct. 14, 1999.

Hayes, Connor, et al., "Smart Radio—A Proposal," Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Hoffman, Thomas, et al., "Latent Class Models For Collaborative Filtering," Proceedings Of The Sixteenth International Joint Conference on Artificial Intelligence, IJCAI 99, Stockholm, Sweden, Jul. 31-Aug. 6, 1999, Online! pp. 688-693, XPOO2279578, Retrieved from the Internet <URL:http:/Avww.cs.brown.edu/(th/papers/HofmannPuzicha-IJCA199).pdf>, retrieved on May 7, 2004.

Internet Papers: Freetantrum: Songprint 1.2, and computer code; www.freetantrum.org; Dec. 11, 2000; 46 pages.

Jones, Karen Sparck and Willett, Peter, "Readings In Information Retrieval," Morgan Kaufmann Publishers, Inc., 1997, pp. 25-110, 205-246, 257-412, 440-445, 469-502, 527-533.

Karen Sparck Jones, "Search Term Relevance Weighting Given Little Relevance Information," pp. 329-338, (originally located in Journal of Documentation, vol. 35, No. 1; Mar. 1979, pp. 30-48).

Shah, Tej, "Improving Electronic Commerce Through Gather Customer Data," TCC402 [online] Apr. 23, 1998 XP002379874, University of Virginia, USA, Retrieved from the Internet: <URL:http://www.lib.virginia.edu> [Retrieved on May 8, 2006] *the whole document*.

Lauren B. Doyle, "Indexing and Abstracting by Association—Part 1," pp. 25-38, Santa Monica, CA, Found in: *Readings in Information Retrieval, Edited by Karen Sparck Jones and Peter Willett, Morgan Kaufmann Publishers, Inc., San Francisco, CA © 1997.*

Liu, Zhu, Wang, Yao and Chen, Tsuhan, "Audio Feature Extraction and Analysis for Scene Segmentation and Classification," Journal of VLSI Signal Processing 20.61-79 (1998).

Loeb, Shoshana, "Architecting Personalized Delivery Of Multimedia Information," Communications Of The ACM, vol. 25, No. 12, Dec. 1992, pp. 39-50, XP002102709.

M.E. Maron & J.L. Kuhns, "On Relevance, Probabilistic Indexing and Information Retrieval," pp. 39-46, Found in: *Readings in Information Retrieval, Edited by Karen Sparck Jones and Peter Willett, Morgan Kaufmann Publishers, Inc., San Francisco, CA © 1997.*

Nichols, David M. et al., Recommendation And Usage In The Digital Library, Technical Report Ref. CSEG/2/1997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2007.

Schafer, J. Ben, et al., "Recommender Systems In E-Commerce," Proceedings ACM Conference On Electronic Commerce, 1999, pp. 158-166, XP002199598.

Stubblefield, Adam and Wallach, Dan S., "A Security Analysis of My.MP3.com and the Beam-it Protocol," Department of Computer Science, Rice University.

W.J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones & Peter Willett, Morgan Kaufmann Publishers, Inc., San Francisco, CA © 1997.

Wold, Erling, Blum, Thorn, Keislar, Douglas and Wheaton, James, "Conent-Based Classification, Search, and Retrieval of Audio," IEEE MultiMedia, Fall 1996.

Written Opinion of the Patent Cooperation Treaty for International Patent Application No.: PCT/US02/03504.

* cited by examiner

DETERMINING A KNOWN CHARACTER STRING EQUIVALENT TO A QUERY STRING

CROSS REFERENCE TO RELATED APPLICATIONS

The present application claims priority from U.S. patent application Ser. No. 09/846,823 for "Relationship Discovery Engine," filed Apr. 30, 2001, the disclosure of which is incorporated herein by reference. The present application also claims priority from provisional U.S. Patent Application Ser. No. 60/201,622, for "Recommendation Engine," filed May 3, 2000, the disclosure of which is incorporated herein by reference.

BACKGROUND

A. Technical Field

The present invention is related to text equivalencing, and more particularly, to text equivalencing for human language text, genetic sequences text, or computer language text.

B. Background of the Invention

In many contexts finding equivalent text is desirable. Equivalent texts are two pieces of text that are intended to be exactly the same, at least one of which contains a misspelling or typographical error or an difference in representation such as using a symbolic representation of a word or a different word order. One context where finding equivalent text is desirable is in identifying a song or book by its textual identifiers such as title, artist or author, album name or publisher name, etc. Another such context is in identifying genetic sequences. In these and other contexts, it is desirable to be able to identify equivalent texts because typographical errors or misspellings can occur. In particular, misspellings occur with a high frequency with foreign-sounding text or names, or when the text is the product of voice transcription. Also, there are times when certain words, such as, "the" are omitted or added erroneously, or a character is replaced by a word or vice versa, for example "&" to "and" or "@" to "at."

In the context of text equivalencing for textual information related to music, there are many ways the text ends up close, but not exactly the same. For example, when a song is downloaded the information can be typed in manually by the user, thus increasing the chance for error. In the context of a software music player it is generally important to identify the track of music by the textual information. If the textual information cannot be determined it is difficult to identify the music track.

One method of identifying an equivalent text is by applying a simple set of heuristics to the text and then comparing it to known texts. The simple set of heuristics can overcome problems of variable amounts of white space and omitting or adding words such as "the" at the beginning of an album or book name. However, such heuristics fall short when it comes to typographical errors or misspellings. It is not possible to apply a heuristic for every possible mistyping or misspelling based on every possible pronunciation of every word in the text. The problem is further compounded when the words are not actual language words, but instead are proper names, genetic sequences, acronyms, or computer commands. In those contexts, predicting the mistakes and forming the heuristics is more difficult than when the words are language words.

What is needed is a system and method of text equivalencing that avoids the above-described limitations and disadvantages. What is further needed is a system and method for text equivalencing that is more accurate and reliable than prior art schemes.

SUMMARY OF THE INVENTION

The present invention provides a text equivalencing engine capable of determining when one string of characters or text is equivalent or probably equivalent to another string of characters or text. In one embodiment, the string of characters is textual information describing a track of music such as a song title, artist name, album name or any combination of these attributes. In another embodiment, the string of characters is textual information describing a book or magazine such as title of the book or magazine, author name, or publisher. In another embodiment, the text is a genetic sequence or the text is a computer program listing. One skilled in the art will recognize that the techniques of the present invention may be applied to any type of text or character string. The present invention can determine when two strings of characters are equivalent even when there are misspellings or typographical errors that are not addressed by a set of heuristics. The present invention can be used to accurately perform text equivalencing in most cases. Thus, the present invention overcomes the above-described problems of misspellings and typographical errors.

The text equivalencing is performed by first applying a set of heuristics. The set of heuristics modifies the text to be equivalenced by a set of rules. The rules are designed to eliminate common mistakes such as eliminating or adding whitespace, adding or deleting the word "the," changing "&" to "and" and vice versa, and a few common misspellings and typographical errors.

The modified strings are compared to known strings of characters or text. If a match is found, the text equivalencing process is exited successfully. If an exact match is not found, the string of characters is separated into sub-strings. The sub-strings can be of any length. In one embodiment, the sub-strings are typically three characters long and are referred to as 3-grams. In another embodiment, the length of the sub-strings is adaptively determined.

Any information retrieval technique can be applied to the sub-strings to perform accurate text equivalencing. In one embodiment, the information retrieval technique weights the string of characters and scores other known strings of characters using a technique known as Inverse Document Frequency (IDF) as applied to the sub-strings in each string of characters. If the highest scoring known string of characters scores above a first threshold, $t_1$, then that known string of characters is accepted as a match to the string of characters and all other known strings are considered not to be matches. If one or more of the scores is between the first threshold, $t_1$, and a second threshold, $t_2$, the string of characters is accepted as a match after a user manually confirms the match and all known strings scoring below $t_2$ are discarded. If no known strings score above $t_2$ and there is a set of known strings scoring between the second threshold, $t_2$, and a third threshold, $t_3$, all strings scoring in this range are presented to the user as options and all strings scoring below $t_3$ are discarded. The user can select one of the strings as a match. If the scores are all below the third threshold, $t_3$, the strings are ignored and a match is not determined. Once a match is determined, the matching string can be updated to reflect the fact that the string of characters is equivalent to it.

As can be seen from the above description, the present invention may be applied to many different domains, and is

DETAILED DESCRIPTION OF THE PREFERRED EMBODIMENTS

The following description of preferred embodiments of the present invention is presented in the context of a text equivalencing engine for any string of characters. In some embodiments, it may be implemented for use in identifying mistyped or misspelled song titles, artist names or album titles for an Internet-based jukebox or for identifying genetic sequences. One skilled in the art will recognize that the present invention may be implemented in many other domains and environments, both within the context of text equivalency, and in other contexts. Accordingly, the following description, while intended to be illustrative of a particular implementation, is not intended to limit the scope of the present invention or its applicability to other domains and environments. Rather, the scope of the present invention is limited and defined solely by the claims.

Figure 1:
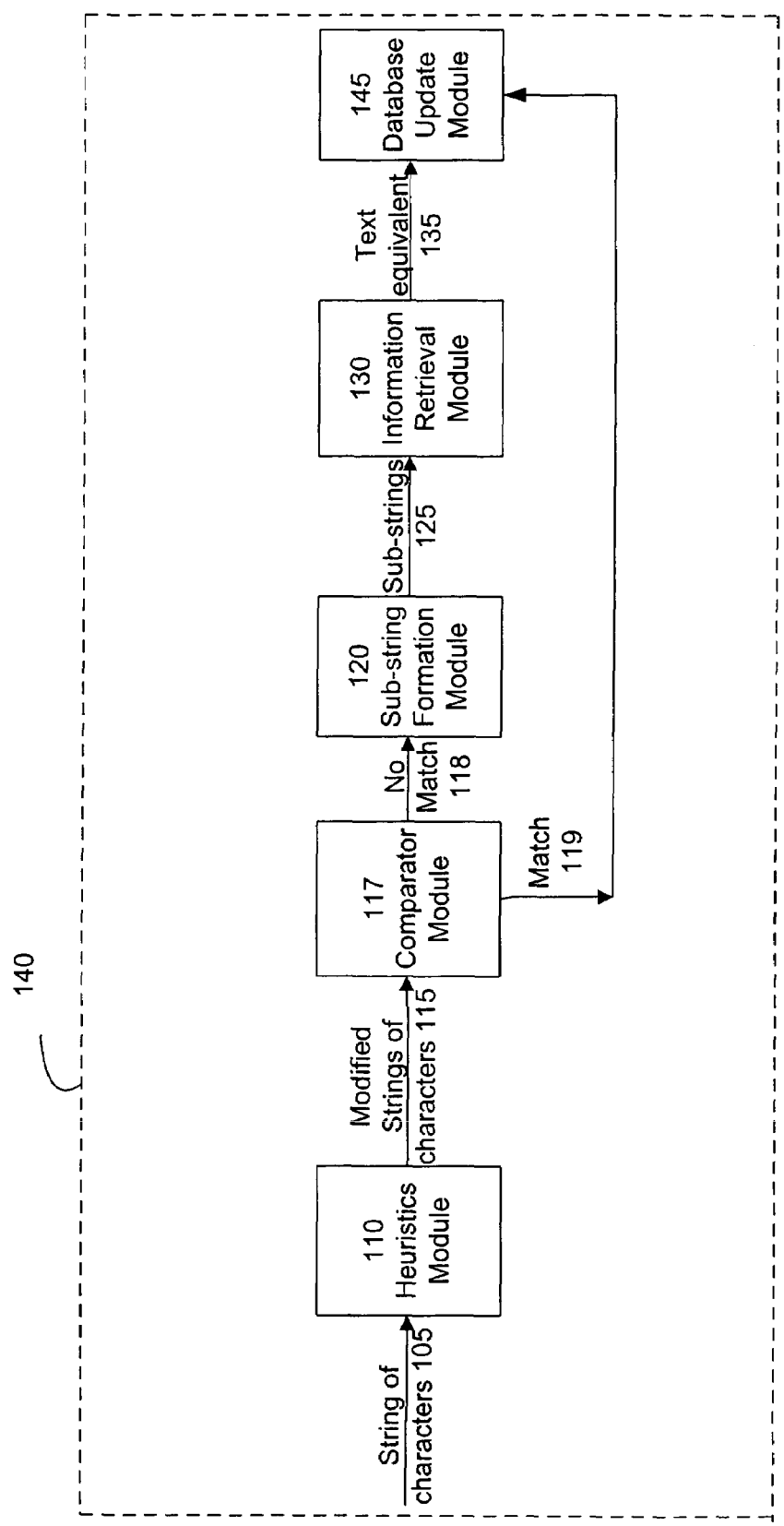
FIG. 1 is a block diagram of a functional architecture for text equivalencing.
Figure 2:
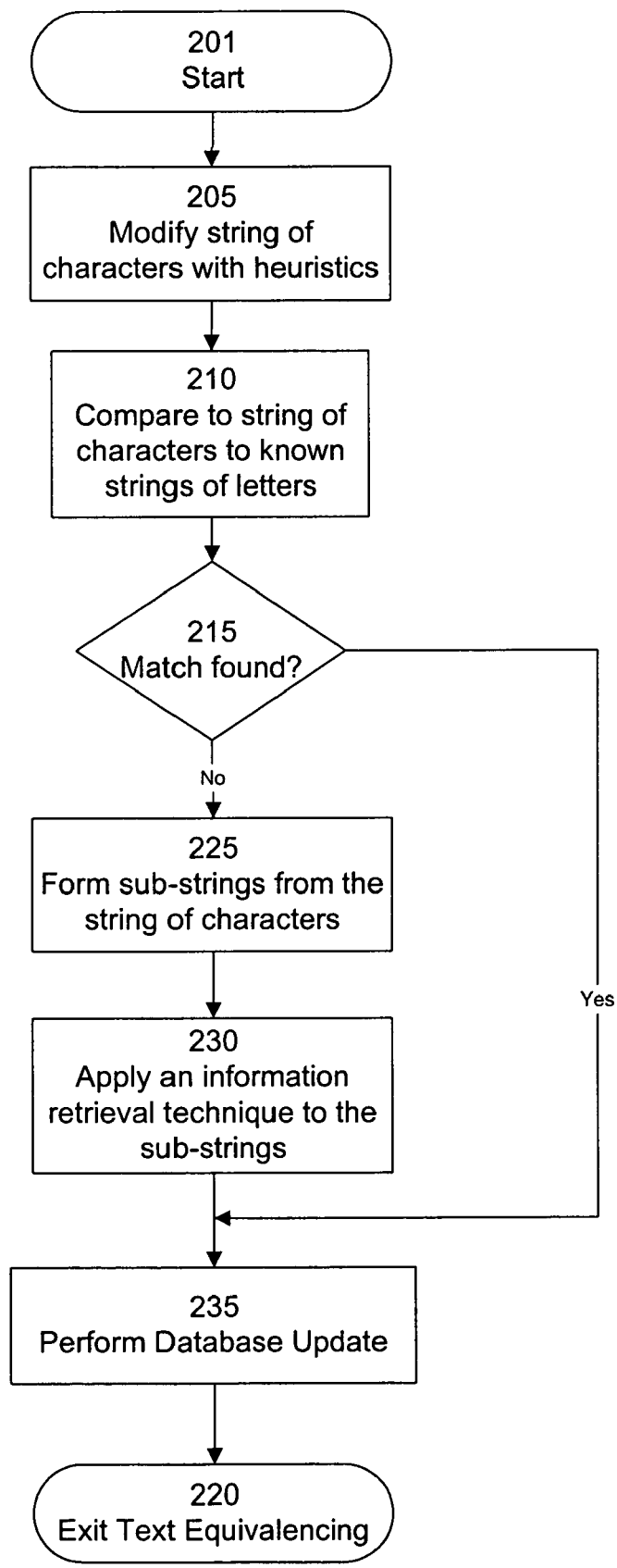
FIG. 2 is a flow diagram of a method of text equivalencing in accordance with the present invention.

Now referring to FIG. 1, there is shown a block diagram of a functional architecture for text equivalencing. Also, referring to FIG. 2, there is shown a method of text equivalencing. Text equivalencing is useful for determining when one string of characters is equivalent to another string of characters. A character may be any letter, number, space, or other symbol that can be inserted into text. In an Internet jukebox or personalized radio system, it is typically important to be able to identify a track of music by its title, artist, and album name because such a system makes recommendations based on a history of listener behavior. In other domains it is also important to be able to determine when one piece of text is equivalent to another. For example, in genetic sequencing it is useful to determine when two genetic sequences are equivalent. Also, in computer programming, text equivalencing can be an important tool as a reverse engineering tool for documenting large programs.

The text equivalencing engine 140 takes a string of characters 105 and determines a text equivalent 135 to the string of characters. A heuristics module 110 modifies the character string by applying a set of rules to the string of characters 205. In one embodiment, there are typically about 50 heuristics that are applied. However, there could be fewer or greater than 50 heuristics applied depending on the system and the type of text.

In one embodiment, the heuristics include omitting whitespace, adding or deleting the word "the," converting "&" to "and" and vice versa, and any other heuristic as may be appropriate or desired. Also, if the string of characters is words in a human language, a heuristic could be applied that changes the order of the words in the string such as in the modification of "Einstein, Albert" to "Albert Einstein." In one embodiment, once the heuristics have been applied, a database containing known character strings is searched by comparator module 117 to find any exact match to the character string or any of the new characters strings created by modifying the character string in accordance with the heuristics 205. If such a match 119 is found 215, text equivalencing engine 140 ceases searching for equivalents and the database update module 145 performs database update 235, a process by which the set of known character strings are updated to indicate that the string of characters is an equivalent text.

If no match 118 is found 215, the character strings 115 are divided into sub-strings. Sub-strings 125 are formed in the sub-string formation module 120 by selecting frequently occurring groups of characters 225. The formation of sub-strings is further described below in reference to FIG. 4. In one embodiment, the sub-strings 125 are 3-grams. A 3-gram is a sub-string 125 that is three characters in length. In another embodiment, the sub-strings 125 can be of any length and are selected by frequency in the corpus of known strings.

The sub-strings 125 are input into an information retrieval module 130. The information retrieval module can perform any accurate information retrieval technique to retrieve an equivalent text 135 to the character string 105 from a database of known character strings 230. Any information retrieval technique may be implemented. Examples of such information retrieval techniques are discussed in G. Salton & M. McGill, "Introduction to Modern Information Retrieval," McGraw-Hill, 1983 and P. Willet and K. Sparck Jones (ed), "Readings in Information Retrieval," Morgan Kaufmann, 1997.

In one embodiment, module 130 employs an information retrieval technique 230 using a score relative to each known string of characters in the database. The score is based on a term-weighting scheme described below in reference to FIG. 5. After the information retrieval module 130 determines an equivalent text or a set of candidate equivalent texts 230, database update module 145 typically updates a database of known equivalent texts to indicate that the string of characters is equivalent 235. The database update module 145 is further described below with the reference to FIG. 3.

The most likely equivalent string of characters is determined by the retrieval score as produced by the information retrieval module 130. The score is evaluated based on three threshold values, $t_1$, $t_2$, and $t_3$. Typically, $t_1 > t_2 > t_3$, creating four regions, greater than $t_1$, between $t_1$ and $t_2$, between $t_2$ and $t_3$, and less than $t_3$. If the highest of the of the scores is greater than a first predetermined threshold value, $t_1$, the text with that score is accepted as an equivalent to the string of characters without any manual intervention. If the highest of the scores is between the first threshold, $t_1$, and a second predetermined threshold, $t_2$, that text is accepted as an equivalent to the string of characters after a user manually confirms the match. If there are one or more scores between the second threshold value, $t_2$, and a third predetermined threshold value, $t_3$, each text scoring in that range is presented to the user. One piece of text is accepted as an equivalent to the string of characters only after being selected by the user. If all the scores are below the third threshold, $t_3$, no equivalent is found. In one embodiment, the threshold values are empirically determined to optimize the amount of manual labor needed to build a table of text equivalences.

Figure 3:
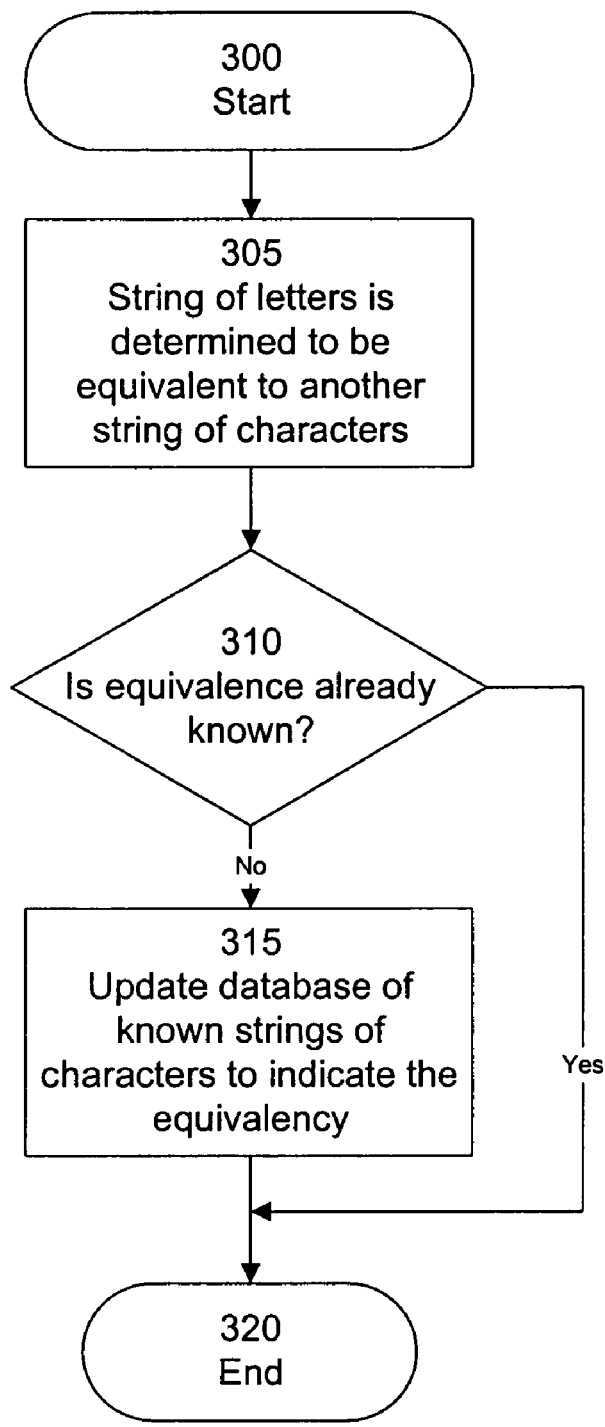
FIG. 3 is a flow diagram of a method of database update in accordance with the present invention.

Now referring to FIG. 3, there is shown a method of performing database update 235. Database update is performed 235 when an equivalent but not identical text has been found and accepted 305. If an equivalent text is determined, the database update module 145 performs database update 235. In one embodiment, database update involves updating 310 the database that stores the known strings of characters to indicate that the string of characters is an equivalent text. The database update module 140 takes into consideration any user confirmation or selection that is made in accepting the document as equivalent text. Thus, if the same string of characters 105 is input into the text equivalencing engine 140 on a subsequent run, there will be no need to run through the entire text equivalencing engine 140.

Figure 4:
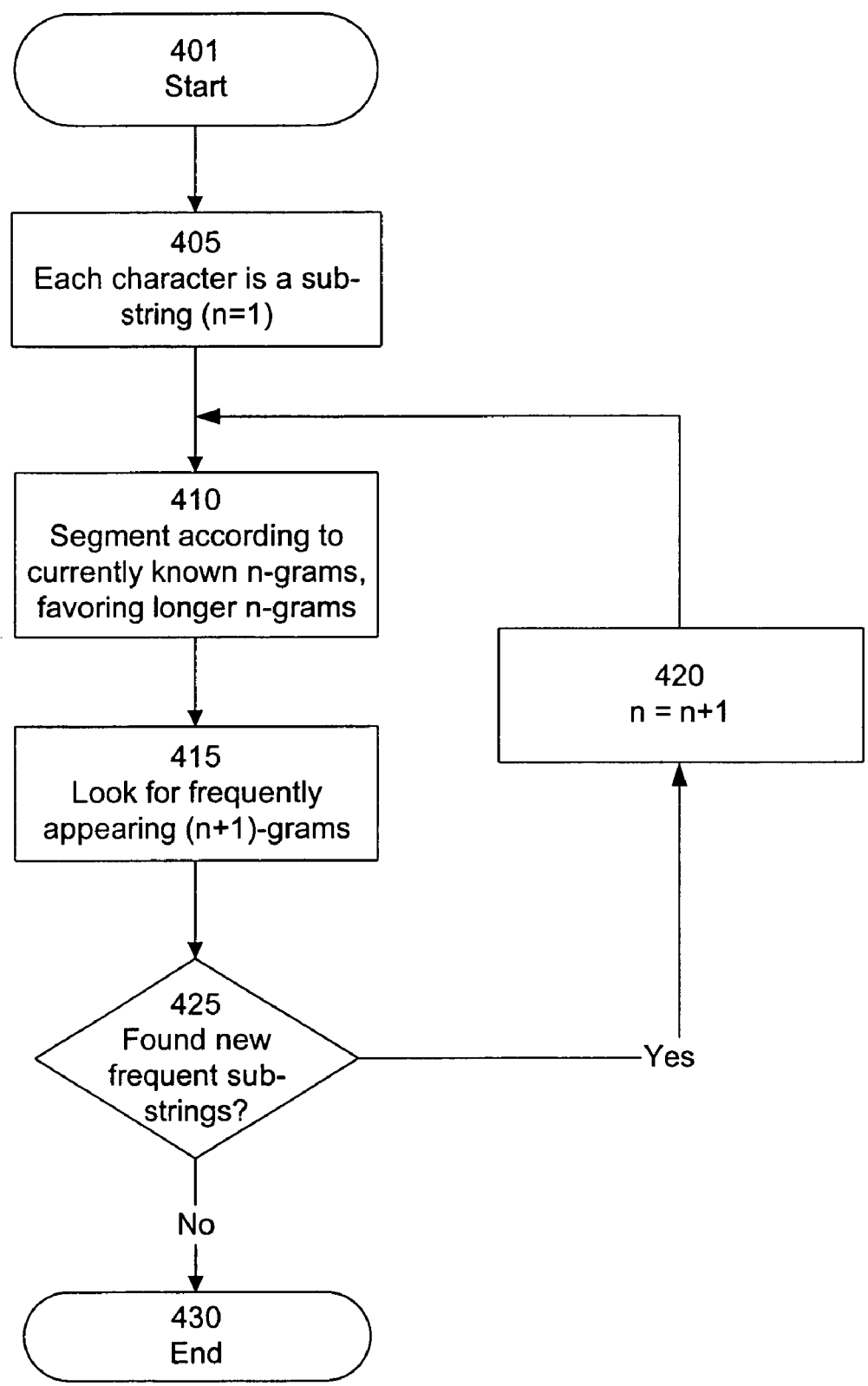
FIG. 4 is a flow diagram of a method of grouping characters to form sub-strings.

Now referring to FIG. 4, there is shown a method of forming variable length sub-strings from a string of characters. Sub-strings are formed from a series of characters in a given string of characters by extending the sub-strings based on the frequency of occurrence of the extended sub-strings. In one embodiment, there are two thresholds that together define whether a sub-string is considered "frequently appearing" in each document. The threshold values are chosen such that the words yield an accurate, fast, and memory-efficient result of identifying a character string. The first threshold, for the purpose of sub-string formation, is a minimum number of appearances of a sub-string in a document. In one embodiment, the second threshold, for the purpose of sub-string formation, is a maximum number of appearances of a sub-string in a document. A sub-string is considered to be "frequently appearing" if its frequency lies between the thresholds for sub-string formation. In an alternate embodiment, only one of the two thresholds for sub-string formation is used.

When sub-strings are formed, initially, each character is assumed to be a sub-string 405. Then, in one embodiment of the present invention, the system looks for extensions of frequently appearing sub-strings 410 formed by adding one character. These are also considered sub-strings. In one embodiment, the system then looks for frequently appearing 3-grams 415 (a three letter word). In one embodiment, the system then looks for frequently appearing 4-grams 415. Finally, the system looks for frequently appearing n-grams 415, where n is any positive integer value greater than 2. In one embodiment, in the event of overlap between a substring and any longer sub-string, the system favors the longer sub-string 425 and presumes that the shorter did not occur. The result is a series of the longest frequently appearing n-grams. In another embodiment, the system favors 3-grams, instead of favoring the longer sub-strings. In another embodiment, frequency of occurrence is determined relative to a separate large corpus of strings.

The following is a hypothetical example of sub-string formation for an arbitrary string of letters from the alphabet. The letters could be any kind of symbol, but for this hypothetical are only alphabetical letters. Normally the entire corpus of known strings would be used to build a dictionary of possible sub-strings, but this example is a short string in order to simplify the description.

a g e c q r t 1 m s d s p 1 c q r r a g e t 1 p r a g e s 1

Assume for this hypothetical example that the threshold for purposes of sub-string formation is 2. Each character is initially taken to be a sub-string 405. The character pair "ag" appears 3 times, making it a frequently appearing sub-string 410, according to the threshold value for sub-string formation. The 3-gram, "age," appears 3 times making it a frequently appearing sub-string 415. The 4-gram "rage" also occurs twice. The sub-strings "agec," "aget," and "ages" each only appear once. Therefore no more characters should be added and the 4-gram "rage" is the longest n-gram that can be formed to meet the frequently appearing sub-string criteria. The same process could be performed on the second character in the string, "g." However, since "ge" overlaps with "rage", the "ge" sub-string would be eliminated when favoring longer sub-strings 420.

The same process could be performed to form the sub-string "cqr" as to form the sub-string "rage." After the system finished forming sub-string on this string the following sub-strings would be formed: "rage" appearing 2 times, "cqr" appearing 2 times, "t1" appearing 2 times, and a number of 1-grams appearing various numbers of times. Thus the decomposition of the larger string into sub-strings would be:

a/g/e/cqr/t1/m/s/d/s/p/1/cqr/rage/t1/p/rage/s/1

An information retrieval technique is performed on the sub-strings to find an equivalent text. In one embodiment, the information retrieval technique involves the sub-strings and scoring known pieces of text that are also divided into sub-strings. In one embodiment, the present invention employs an inverse document frequency method for scoring sub-strings in the string of characters and known text.

Figure 5:
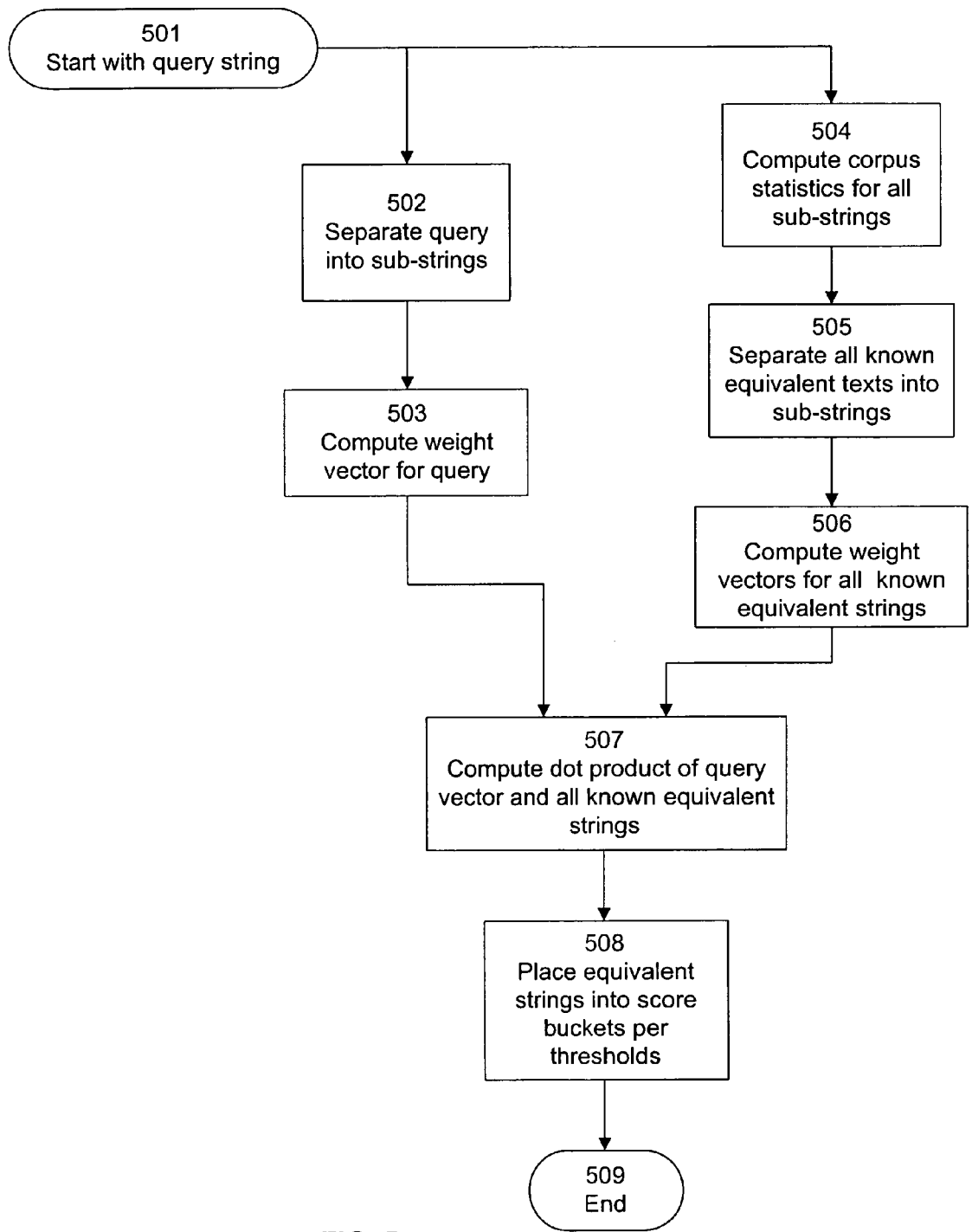
FIG. 5 is a flow diagram of a method of scoring text and strings of characters using the present invention.

Referring now to FIG. 5, there is shown a flow diagram of a method of weighting sub-strings and scoring texts according to the present invention. The method illustrated in FIG. 5 is shown in terms of matching sub-strings in a text equivalencing system. One skilled in the art will recognize that the method may be adapted and applied to many domains and techniques.

A total number of texts N is determined 504. The system also determines a text frequency for each sub-string j (the number of times sub-string j occurred, or $TF_j = \Sigma(k_{ij} > 0)$ where $k_{ij}$ is the number of times that text i contains sub-string j) 504.

Weights are computed for query sub-strings and for sub-strings of each equivalent text. The weights are computed according to a product of up to three components: l=the number of times a sub-string appears in the string of characters; g=the number of times a sub-string appears in the known text; and n=a normalizing factor based on the entire weight vector.

The first weighting factor, l, is a local weighting factor. It represents the frequency of the sub-string within a string of characters. It may be represented and defined according to the following alternatives as well as others known in the art of information retrieval:

$l_\tau = k_{ij}$ = Number of times sub-string j occurs in the string i; or $l_L = \log(k_{ij} + 1)$; or $l_x = 1$ (a constant, used if this weighting factor is not to be considered).

l may be adjusted to account to optimize performance for different kinds of strings.

The second weighting factor, g, represents the frequency of the sub-strings within all the known texts. It may be represented and defined according to the following alternatives as well as others known in the art of information retrieval:

$$g_l = \log \frac{N+1}{TF_j + 1}$$

(inverse text frequency, i.e., the log of the total number of texts divided by the text frequency for sub-string j); or $g_x = 1$ (a constant, used if this weighting factor is not to be considered).

g may be adjusted in a similar manner as is l to optimize performance.

The third weighting factor, n, represents a normalizing factor, which serves to reduce the bias that tends to give long texts higher scores than short ones. Using a normalizing factor, a short, specifically relevant text should score at least as well as a longer text with more general relevance. n may be represented and defined according to the following alternatives as well as others known in the art of information retrieval:

$$n_c = \frac{1}{\sqrt{\sum_j (l_j)^2 (g_{ij})^2}}; \text{ or}$$

$n_x=1$ (a constant, used if this weighting factor is not to be considered).

By employing the above-described combination of three weighting factors in generating weights for sub-strings and scores for texts, the present invention avoids the problems of overstating frequently appearing sub-strings and overstating coincidental co-occurrence. If a sub-string is frequently occurring, the second weighting factor will tend to diminish its overpowering effect. In addition, the effect of coincidental co-occurrence is lessened by the normalization factor.

In one embodiment, the system of the present invention generates scores as follows. Each sub-string j 502 in query string 501 i is weighted 503 using the general formula $q_{ij}=l_{ij}g_jn_i$, where l, g, n are defined above. The weight $w_{ij}$ for each sub-string 505 j in each known text i is obtained 506 using the general formula $w_{ij}=l_{ij}g_jn_i$, where l, g, n are defined above. The specific options for defining l, g and n can be chosen based on the desired results. In one embodiment of the present invention, it is desired to preserve diversity, to give rarity a bonus, and to normalize. In that embodiment, the weighting options L, I, and C may be chosen. Weighting option L acts to preserve diversity, option I acts to give variety a bonus, and C acts to normalize the results. Thus, in that embodiment the weighting would be equal to $l_L g_I n_C$. In other embodiments, different weighting options may be used. In one embodiment, the present invention uses the same weighting for the query sub-strings as it does for scoring the known texts. In an alternative embodiment, different weighting options can be chosen for the query sub-strings and for scoring the known texts.

A score for a text is determined by taking the dot product 507 of the query vector and the document vector $$\sum_j q_{kj} w_{ij}.$$

In one embodiment of the present invention, the above-described weighting factors are used to create the vector terms in order to improve the results of the scoring process. The score falls into one of four categories 508 and the results are output 509, depending on the value of the score, as described below. If the highest score is greater than a first threshold value, $t_1$, the text is accepted as an equivalent text. In one embodiment, this range of scores is considered the gold range. If the highest score is between the first threshold value, $t_1$, and a second threshold value, $t_2$, that text is accepted as an equivalent text after manual user confirmation. In one embodiment, this range of scores is considered the silver range. If one or more scores falls in a range between the second threshold value, $t_2$, and a third threshold value, $t_3$, each of the texts scoring in that range are presenting to the user. The user can select a text to be accepted as equivalent text. In one embodiment, this range of scores is considered the bronze range. If all the texts score below the third threshold value, $t_3$, all of the texts are ignored and an equivalent text is not determined.

In one embodiment, the threshold values are adjusted empirically to give the desired accuracy. In one embodiment, the desired accuracy is about 100% in the gold range. In one embodiment, the desired accuracy in the silver range is 70-80% the top one text equivalent and 90% in the top five text equivalents. In one embodiment, the bronze range is about 20-40% accurate and 50% in the top five.

Once the query sub-strings have been weighted and the known texts have been scored by computing the dot product of two vectors, the text or texts with the highest score or highest scores are determined. An equivalent text is selected using the threshold values described above.

From the above description, it will be apparent that the invention disclosed herein provides a novel and advantageous system and method for text equivalencing. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where text equivalencing is desirable. Accordingly, the disclosure of the present invention is intended to illustrative, but not limiting, of the scope of the invention, which is set forth in the following claims.

We claim:

1. A computer-implemented method comprising:
    modifying a query string of characters using a predetermined set of heuristics;
    performing a character-by-character comparison of the modified query string with at least one known string of characters in a corpus in order to locate an exact match for the modified query string; and
    responsive to not finding an exact match, performing the following steps in order to locate an equivalent for the modified query string:
        forming a plurality of sub-string of characters from the query string, the sub-strings having varying lengths such that at least two of the formed sub-strings differ in length; and
        using an information retrieval technique on the sub-strings formed from the query string to identify a known string of characters equivalent to the query string,
    wherein the information retrieval technique further comprises:
    weighting the sub-strings;
    scoring known strings of characters; and
    retrieving information associated with the known string having the highest score.

2. The method of claim 1, further comprising, responsive to the highest score being greater than a first threshold, automatically accepting the known string having the highest score as an exact match.

3. The method of claim 1, further comprising, responsive to the highest score being less than a second threshold and greater than a first threshold, presenting the known string having the highest score to a user for manual confirmation.

4. The method of claim 1, further comprising, responsive to the highest score being less than a second threshold and greater than a third threshold, presenting the known string having the highest score to a user to select the equivalent string.

5. The method of claim 1, wherein forming a plurality of sub-strings of character comprises successively extending sub-strings based on frequency of occurrence in the modified query string.

6. The method of claim 1, wherein the query string is selected from the group consisting of a song title, a song artist, an album name, a book title, an author's name, a book publisher, a genetic sequence, and a computer program.

7. The method of claim 1, wherein the predetermined set of heuristics comprises removing whitespace from the query string.

8. The method of claim 1, wherein the predetermined set of heuristics comprises removing a portion of the query string.

9. The method of claim 1, wherein the predetermined set of heuristics comprises replacing a symbol in the query string with an alternate representation for the symbol.

10. The method of claim 1 further comprising storing a database entry indicating that the query string is an equivalent of the identified known string.

11. The computer-implemented method of claim 1, wherein the length of a sub-string is determined based on one or more character sequences identified in the modified query string and a corresponding frequency of occurrence for each identified character sequences.

12. The computer-implemented method of claim 1, wherein a weight for a given sub-string is based at least in part on a number of times the sub-string occurs in the query.

* * * * *